United States Patent [19]

Torii et al.

[11] Patent Number: 4,970,448

[45] Date of Patent: Nov. 13, 1990

[54] METHOD OF AND APPARATUS FOR ASCERTAINING MOTION ABILITIES OF INDUSTRIAL ROBOT

[75] Inventors: Nobutoshi Torii, Hachioji; Ryo Nihei; Akihiro Terada, both of Yamanashi, all of Japan

[73] Assignee: Fanuc Ltd., Yamanashi, Japan

[21] Appl. No.: 408,512

[22] PCT Filed: Jan. 9, 1989

[86] PCT No.: PCT/JP89/00017

§ 371 Date: Aug. 23, 1989

§ 102(e) Date: Aug. 23, 1989

[87] PCT Pub. No.: WO89/06182

PCT Pub. Date: Jul. 13, 1989

[30] Foreign Application Priority Data

Jan. 9, 1988 [JP] Japan ................................. 63-1812

[51] Int. Cl.$^5$ .............................................. G05B 19/18
[52] U.S. Cl. ................................ 318/568.1; 318/563; 318/567; 364/167.01; 364/513; 901/9; 901/23
[58] Field of Search ................................ 318/560–632, 318/52, 71, 81, 245, 803, 811, 268; 901/2, 5, 6, 9, 19, 20, 23, 24, 38, 46; 364/513, 558, 556, 492, 538, 483, 167

[56] References Cited

U.S. PATENT DOCUMENTS

| 4,772,831 | 9/1988 | Casler, Jr. et al. | 901/23 X |
| 4,773,025 | 9/1988 | Penkar et al. | 901/9 X |
| 4,807,153 | 2/1989 | Onaga et al. | 901/9 X |
| 4,831,549 | 5/1989 | Red et al. | 364/167.01 X |

FOREIGN PATENT DOCUMENTS

| 60-11784 | 1/1985 | Japan . |
| 60-209802 | 10/1985 | Japan . |
| 61-58002 | 3/1986 | Japan . |
| 61-114317 | 6/1986 | Japan . |
| 61-159391 | 7/1986 | Japan . |
| 63-253408 | 10/1988 | Japan . |

*Primary Examiner*—William M. Shoop, Jr.
*Assistant Examiner*—Paul Ip
*Attorney, Agent, or Firm*—Armstrong, Nikaido, Marmelstein, Kubovcik & Murray

[57] ABSTRACT

In an industrial robot employing electric motors (Mz, Mθ, Mu, Mw) as drive sources for driving functional robot units for movement respectively about articulatory axes (Z, θ, U, W), electric drive currents supplied to the electric motors (Mz, Mθ, Mu, Mw) associated with the articulatory axes (Z, θ, U, W) are detected by a current detecting unit (30), the detected electric drive current supplied to the electric motor (Mz, Mθ, Mu, Mw) associated with one selected articulatory axis among the articulatory axes (Z, θ, U, W) is sampled every predetermined minute sampling time in a period between a first time and a second time in a robot control program for controlling the motions of the functional robot units respectively about the articulatory axes (Z, θ, W), computing means (CPU) calculates the ratio of the root-mean-square value of the electric current supplied to the electric motor (Mz, Mθ, Mu, Mw) in the period between the first time and the second time to the rated current of the same electric motor, the root-mean-square values ratios each of the root-mean-square value to the rated current are displayed on a display (40) to enable an operator to ascertain the propriety of the motions of the functional robot units (16, 18, 20, 22, 24,) including robot arms.

7 Claims, 3 Drawing Sheets

```
CALCULATION START
COMMAND S1

ROBOT MOTION
COMMANDS

CALCULATION END
COMMAND S2
```

| AXIS NO. | RATIO TO RATED CURRENT OF MOTOR | RMS ELECTRIC CURRENT(Amp) |
|---|---|---|
| 1. ⌈θ⌋ | 1.02 | 12.5 |
| 2. ⌈W⌋ | 0.85 | 10.0 |
| 3. ⌈U⌋ | 1.24 | 3.4 |
| 4. ⌈Z⌋ | 0.90 | 2.0 |

METHOD OF AND APPARATUS FOR ASCERTAINING MOTION ABILITIES OF INDUSTRIAL ROBOT

TECHNICAL FIELD

The present invention relates to a method of and apparatus for ascertaining the motion abilities of an industrial robot, to thereby allow the industrial robot to operate without overloading the drive sources thereof. More particularly, it relates to a method of ascertaining the motion abilities of an industrial robot and an apparatus for carrying out that method, capable of ascertaining the propriety of the movements of robot functional units of the industrial robot about corresponding articulatory axes, in comparison with the respective motion abilities thereof, on the basis of rated electric currents supplied to corresponding electric drive motors during the operation of the industrial robot, respectively.

BACKGROUND ART

Various industrial robots including articulated industrial robots each having articulated functional units, such as a plurality of robot arms, a robot wrist and a turnable robot body, employing electric drive motors (electric servomotors) as drive sources are in use. To enable such an industrial robot to perform robot motions, a robot control unit inputs commands or instructions to respective servomechanisms to electrically drive electric drive motors and mechanically drive the robot functional units according to a control program previously taught to and stored in the robot control unit, and the servomechanisms control the electric drive motors to thereby drive the functional robot units for movement about corresponding articulatory axes. In such an industrial robot employing electric motors as drive sources for moving the robot units about the corresponding articulatory axes, the motion ranges of the robot functional units about the articulatory axes, the operation speeds of the robot units, and the allowable loads on the robot units are limited by the electric rated performance of the corresponding electric drive motors Namely, an accident, such as abnormal overheating and resultant burning of the electric drive motor associated with an articulatory axis when an electric current exceeding the rated value is supplied continuously to the electric drive motor, to meet a required power exceeding the rated power thereof, may occur when carrying out a series of robot motions according to the control program to shift the working point thereof from a given position in the operating space to a subsequent desired position.

Nevertheless, the conventional industrial robot depends on a very primitive means of preventing such a possible accident. That is, an alarm is given when an excessive electric drive-current is supplied to the electric motor and the electric motor becomes overheated during a robot motion due to an excessive load on the industrial robot, or when an inappropriate set motion range or an inappropriate set operating speed occurs, and the conventional preventive means carries out a cumbersome procedure to determine the cause of the alarm through a trial-and-error method including measuring the electric drive current supplied to the electric drive motor, by a current measuring device, i.e., an ammeter, while the electric motor is in operation, recording the output of the current measuring device by a recorder, calculating the level of the actual electric drive current supplied to the electric drive motor with respect to the rated current of the electric drive motor, by a suitable calculator, and deciding whether or not the set operating speed and set acceleration of the related robot unit about the articulatory axis are appropriate. Accordingly, it has been impossible to quickly ascertain the propriety of the instant motions of the industrial robot at an optional moment in the operation of the industrial robot, and to change the control program when necessary. Furthermore, heat generated by the electric drive motors may cause a thermal distortion of a robot functional unit, such as a robot arm, which is a serious problem when the respective robot functional units must move with a high accuracy.

DISCLOSURE OF THE INVENTION

Therefore, an object of the present invention is to provide a method of ascertaining the motion abilities of an industrial robot, whereby the disadvantages of the conventional method and are eliminated, and which is capable of easily ascertaining a control program for and operating conditions of the motions of each unit about a corresponding articulatory axis through a test of one motion of the industrial robot.

Another object of the present invention is to provide an industrial robot provided with a functional means of carrying out the foregoing method of ascertaining the motion abilities of the robot.

A further object of the present invention is to provide a multiarticulated industrial robot provided with an apparatus for carrying out the foregoing ascertaining method, and electric motors as drive sources for driving robot units about corresponding articulatory axes.

In accordance with one aspect of the present invention, there is provided a method of ascertaining the motion abilities of an industrial robot employing a plurality of electric motors as drive sources, respectively, for driving a plurality of functional robot units about a plurality of corresponding articulatory axes, which comprises the steps of:

detecting electric driving currents supplied to the electric motors associated with the articulatory axes;

sampling the detected electric drive current supplied to the electric motor associated with one selected articulatory axis among the plurality of articulatory axes for every predetermined minute sampling time in a period between first and second times in a robot control program for controlling the motions of the functional robot units about the corresponding articulatory axes;

calculating the ratio of the root-mean-square value of the electric current supplied to the electric motor associated with the selected articulatory axis to the rated current of the same electric motor; and displaying the root-mean-square value of the sampled electric currents, and the ratios of the root-mean-square value of the electric current supplied to the electric motor to the rated current of the electric motor to thereby enable an operator to ascertain the propriety of the motions of the industrial robot.

According to this method of ascertaining the motion abilities of an industrial robot, the ratio of the root-mean-square value to the rated electric current for the electric motor associated with each articulatory axis is displayed, and the control program is corrected so that the ratio coincides approximately with 1.0 when the calculated ratio is greater than or smaller than 1.0. Namely, since the amount of heat generated by an electric motor varies in proportion to the square of the value of the electric current passing through the motor, the root-mean-square value of sample currents sampled from the actual electric current supplied to the electric motor is compared with the rated electric current of that electric motor determined by taking into account the thermal durability limit of the electric motor.

In accordance with another aspect of the present invention, there is provided an industrial robot provided with robot units of respective articulatory axe, drive sources for the robot units being constituted by electric motors, the operations of which are controlled by a robot controller comprising:

detecting means for detecting an electric current supplied to each of electric motor for the articulatory axes during movement of the associated functional robot unit about the corresponding articulatory axis;

first storage means for storing the electric current detected by the current detecting mean in the form of digital values;

second storage means for integrating predetermined minute sampling times in a period between a first time and a second time during the movement of each functional robot unit, and storing the result of the integration;

computing means for calculating the ratio of the root-mean-square value of the electric current supplied to the electric motor to the rated current of the same electric motor on the basis of the value of the electric current read from the first storage means at each predetermined minute sampling time and the sum of the predetermined minute sampling times calculated by and stored in the second storage means; and display means for displaying the root-mean-square values of the electric currents supplied to the electric motors and the ratios each of the root-mean-square value to the rated current of the electric motor calculated by the computing means to enable the propriety of the motion abilities of the functional robot units about the associated articulatory axes with reference to the rated currents of the electric motors to be ascertained. The apparatus is capable of directly carrying out the foregoing method of ascertaining the motion faculties of an industrial robot.

BRIEF DESCRIPTION OF THE DRAWINGS

The above and other objects, features and advantages of the present invention will become more apparent from the following description of preferred embodiment thereof taken in conjunction with the accompanying drawings, in which.

BEST MODE OF CARRYING OUT THE INVENTION

Figure 1:
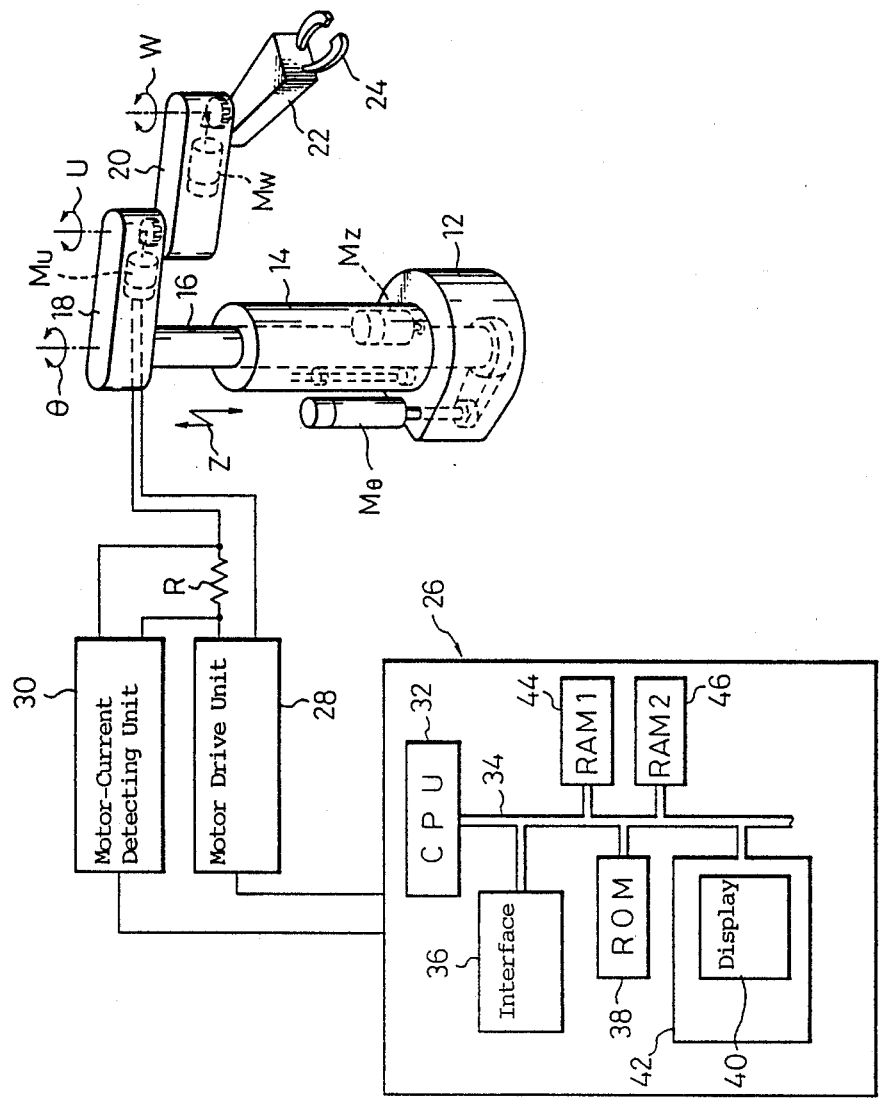
FIG. 1 is a schematic perspective view illustrating the basic constitution of a horizontal arm type multi-articulated industrial robot having a motion ability ascertaining function according to an embodiment of the present invention.

Referring to FIG. 1, a horizontal arm type multi-articulated industrial robot 10 having a motion ascertaining function according to an embodiment of the present invention, has a robot body 14 mounted upright on a robot base 12 and holding a vertical shaft 16 for vertical movement along a vertical axis Z relative to the robot body 14. A first robot arm 18 is joined pivotally at the rear end thereof to the upper end of the vertical shaft 16 for a horizontal turning motion about a vertical axis $\theta$, and a second robot arm 20 is joined pivotally at the rear end thereof to the front end of the first robot arm 18 for a horizontal turning motion about a vertical axis U. A robot wrist 22 is pivotally attached to the front end of the second robot arm 20 for a horizontally turning motion about a vertical axis W, and a robot hand 24, i.e., an end effector, is detachably attached to the front end of the robot wrist 22. The horizontal arm type multi-articulated industrial robot 10 having the horizontally turnable robot arms 18 and 20 and the horizontally turnable robot wrist 22 is provided with electric drive motors (electric servomotors), associated respectively with the axis Z and the articulatory axes $\theta$, U and W as drive sources. The speed of the rotative outputs of the electric drive motors is reduced and transmitted through reduction mechanisms or transmission mechanisms, such as worm gearings, belt-pulley transmission mechanisms or ball-and-screw mechanisms, to drive the robot arms 18 and 20, the robot wrist 22 and the vertical shaft 16, respectively.

In FIG. 1, the electric drive motors associated with the axis Z and the articulatory axes $\theta$, U and W are indicated at Mz, M$\theta$, Mu and Mw, respectively. Each of the electric drive motors Mz, M$\theta$, Mu and Mw is controlled and driven by a servo-control system including a motor driving unit 28 having a servo-mechanism and an electric drive circuit therein, in accordance with instructions given by a robot control unit 26 to the motor drive unit 28, to thereby move the associated functional robot unit at an operating speed denoted by the instructions. Although only the motor drive unit 28 for the electric drive motor Mu is illustrated in FIG. 1, it is obvious that motor drive units similar to the motor drive unit 28 are provided individually for the other electric motors Mz, M$\theta$ and Mw.

Each of the servo-control systems for the electric drive motors Mz, M$\theta$, Mu and Mw further includes a motor-current detecting unit. For example, the servo-control system for the electric drive motor Mu includes a motor-current detecting unit 30 for detecting an electric current of a drive current supply circuit for the electric drive motor Mu. Namely, the motor-current detecting unit 30 detects the electric current for driving the motor Mu by a measurement of an electric voltage drop across a resistor R provided in the drive current supply circuit, converts the value of the detected electric current to a corresponding digital value through an analogue-to-digital conversion, and sends the digital value to the robot control unit 26. As is well known, the robot control unit 26 is provided with a CPU 32, i.e., processing means, for controlling the robot motions of the industrial robot. An interface 36, a ROM circuit 38 storing control programs, a first RAM (1) 44, i.e., an erasable first storage means, a second RAM (2) 46, i.e., an erasable second storage means, and an operating panel 42 provided with a display 40 are connected by a bus 34 to the CPU 32. The motor drive currents detected by the motor-current detecting units 30 respectively for the electric drive motors Mθ, Mu, and Mw are transmitted through the interface 36 to and stored individually in the first RAM 44 of the robot control unit 26.

Various motion control programs for controlling the industrial robot in accordance with working conditions required for the robot, are taught by manually operating the operating panel 42. The motion control programs include a root-mean-square value calculating program for calculating the root-mean-square values of the electric drive currents respectively supplied to the electric drive motors Mz, Mθ, and Mw associated respectively with the articulatory axes in carrying out a series of robot motions. During the series of robot motions, the ratio of the root-mean-square value of the electric drive current supplied to each of the electric motors Mz, Mθ, Mu and Mw to the rated electric current of each of the electric drive motors Mz, Mθ, Mu and Mw, which is stored previously in, for example, the first RAM 44, is calculated, and the results of calculation are indicated on the display 40 of the operating panel 42 to enable the operator to visually check whether the electric drive motors Mz, Mθ, Mu, and Mw are overloaded and the industrial robot is using a full motion faculty thereof. When necessary, the instructions, such as moving speeds, contained in the motion control programs for controlling motions about the articulatory axes can be replaced by other appropriate instructions.

Figures 2, 4:
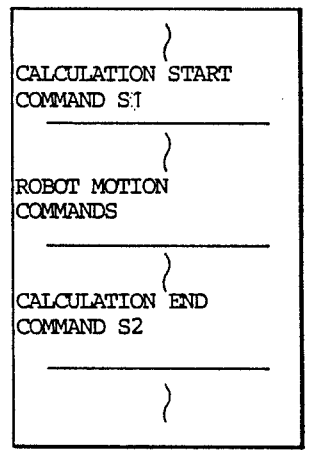
FIG. 2 is a flow chart of an operation program for ascertaining the motion ability of each joint axis of the robot during a robot operation.
FIG. 4 is a plan view of the screen of a display for displaying the ratio of the root-mean-square value of the electric current supplied to each of the electric drive motors to the rated current of the same electric drive motor.

FIG. 2 illustrates an operation program including a motor drive current calculating command.

The operating program illustrated in FIG. 2 comprises a calculation start command S1, program of a series of motions to be sequentially executed, and a calculation end command S2 for terminating the calculation. When carrying out the robot motions between the calculation start command and the calculation end command, the root-means-square value of the electric drive current supplied to one selected electric motor among the electric drive motors Mz, Mθ, and Mw and the ratio of the root-mean-square value to the rated electric current of the selected electric motor are calculated.

Figure 3:
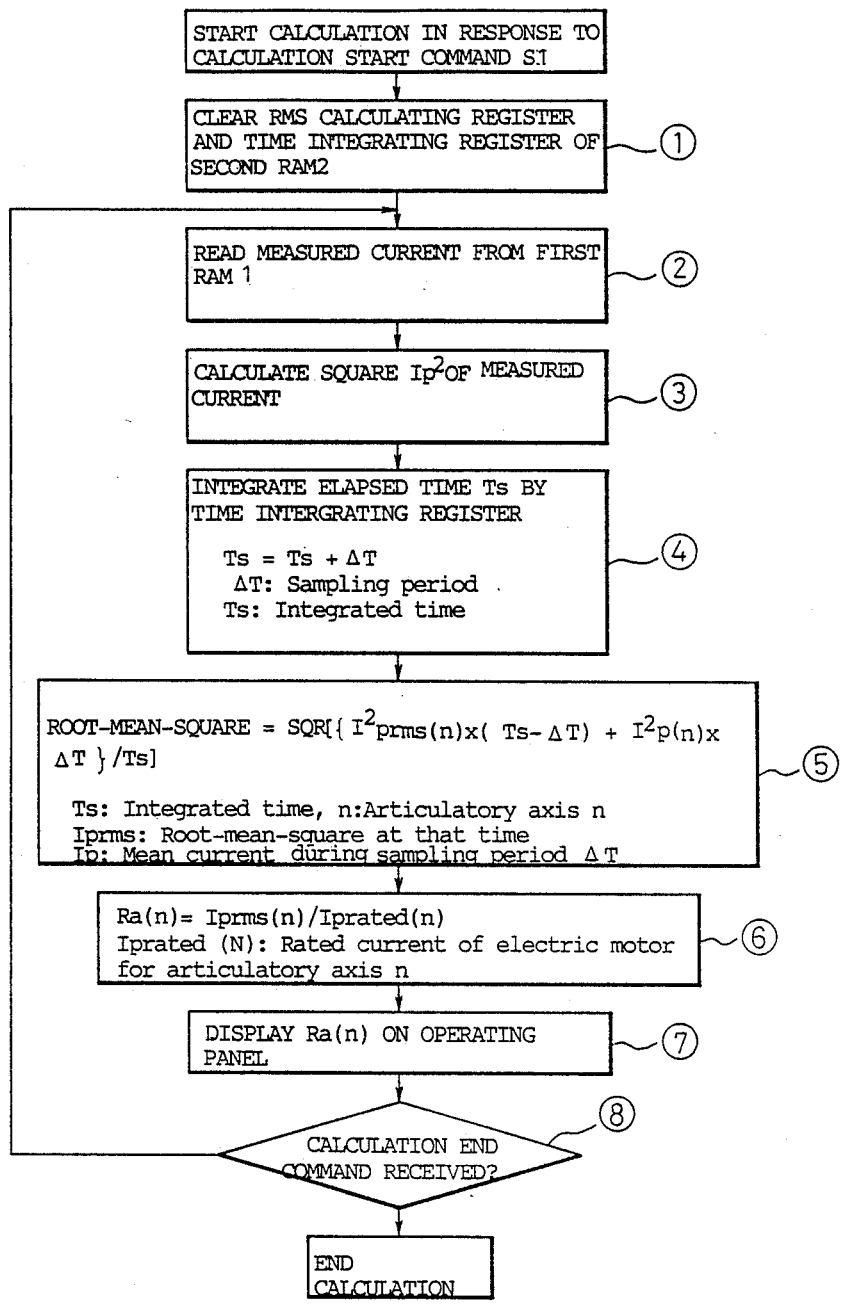
FIG. 3 is a flow chart of a control program for implementing the calculation of a ratio of the root-mean-square value of the electric current supplied to an electric drive motor to the rated electric current of the same electric drive motor by the motion ascertaining function of the industrial robot according to the embodiment of the present invention.

FIG. 3 illustrates a flow chart of the foregoing calculation routine to be implemented by the robot control unit 26. Upon receipt of the calculation start command S1, the CPU 32 clears a mean current calculating register for calculating the mean current relating to one selected articulatory axis among the articulatory axes, and a time integrating register for integrating a time elapsed from when the calculation is started by the second RAM 46 (Step 1). Then, the CPU 32 reads the measured drive currents (digital values) for each electric drive motor from the first RAM 44 (Step 2), and squares the values of the measured drive currents (Step 3). Subsequently, when the time integrating register of the second RAM 46 integrates fixed sampling periods $\_T$ from an elapsed time Ts (Ts=0 at the start of the calculation) from the start of the calculation (Step 4), the CPU 32 calculates the root-mean-square value of the electric drive current during the elapsed time (Step 5): The CPU calculates the ratio of the root-mean-square value of the current to the rated electric current of the corresponding electric drive motor stored previously in the first RAM 44 (Step 6), and displays the calculated ratio on the display 40 of the operating panel 42 (Step 7). The above root-mean-square value of the electric drive current and the integrated times are both stored in a predetermined register of the second RAM 46 each time the calculation is completed. The above-mentioned calculation is repeated at a fixed sampling period $\_T$ for a time Ts until the CPU 32 receives the calculation end command (Step 8). Thus, the root-mean-square value of the electric drive current supplied to an electric drive motor between the calculation start command S1 and the calculation end command S2 can be calculated, and on the basis of that calculation, a discrimination of whether or not an electric drive current exceeding the rated electric current is supplied to the electric drive motor is carried out.

The display 40 displays the respective root-mean-square values of the electric drive currents supplied respectively to the electric drive motors Mz, Mθ, and Mw, and the ratios of respective root-mean-square values of the electric current supplied to respective electric drive motors to the electric rated current of the corresponding electric drive motor.

FIG. 4 illustrates an example of the ratios of respective root-mean-square values to the corresponding electric rated current, and the root-mean-square values for the electric drive motors Mz, Mθ, Mu and Mw displayed on the display 40. It is known from the data displayed on the display 40 that the ratios for the electric motors Mθ and Mu are greater than 1.0, namely, the electric drive currents supplied respectively to the electric motors Mθ and Mu are greater than the corresponding electric rated currents, and thus the electric drive motors Mθ and Mu could be overheated. In such a case, the robot control program is changed and corrected so that all ratios exceeding 1.0 are reduced to approximately 1.0. On the other hand, if some of the ratios are much less than 1.0, it is determined that the motions about the articulatory axes relating to the ratios much less than 1.0 are not employing the full ability of the industrial robot. In such a case, the robot control program is corrected to increase the speed and acceleration of movements about the related articulatory axes.

As apparent from the foregoing description, according to the present invention, the robot control unit of an industrial robot employing electric drive motors as drive sources for the movements of the component functional robot units respectively about articulatory axes calculates, by a simple calculation process, data for determining whether the moving range and moving speed of the functional robot units and load on the electric drive motors when carrying out a series of robot motions are appropriate; i.e., if the motion ability of the industrial robot is properly exerted when moving the functional robot units about the articulatory axes, and displays the results of the calculation on a screen so that the operating condition of the industrial robot can be visually ascertained. The robot control program is corrected, if necessary, by reference to the displayed data, to provide an optimum robot control program.

Accordingly, the industrial robot is able to exert its full ability and overheating of the electric drive motors can be prevented.

Although the present invention has been described as applied to a horizontal arm type multi-articulated industrial robot, the present invention is equally applicable to various articulated industrial robots other than the horizontal arm type multi-articulated industrial robot.

Many changes and variations of the present invention are possible in the light of the above teachings, without departing from the scope thereof, and therefore it should be understood that the present invention is applicable to industrial robots employing electric motors as drive sources for driving the functional robot units thereof, other than articulated industrial robots, to provide the industrial robots with a motion ability ascertaining function.

We claim:

1. A method of ascertaining motion abilities of an industrial robot employing electric motors as drive sources, respectively, for driving functional robot units for movement respectively about a plurality of articulatory axes, comprising steps of:

detecting electric drive currents supplied respectively to said electric motors associated with the articulatory axes;

sampling the detected electric drive current supplied to said electric motor associated with one selected articulatory axis among said plurality of articulatory axes at each predetermined minute sampling time in a period between a first time and a second time in a robot control program for controlling the motions of said functional robot units about the corresponding articulatory axes, and calculating the ratio of the root-mean-square value of the electric current supplied to said electric motor to the rated current of the same electric motor; and displaying the root-mean-square values of the sample electric currents, and the ratios each of the root-mean-square value of the electric current supplied to said electric motor to the rated current of the same electric motor;

whereby an operator can ascertain the propriety of the motions of said industrial robot.

2. A method of ascertaining motion abilities of an industrial robot according to claim 1, wherein said first time and said second time are a calculation start time and a calculation end time, respectively, included in the robot control program.

3. An industrial robot employing electric motors as drive sources respectively for driving a plurality of functional robot units for movement respectively about a plurality of articulatory axes under the control of a robot control unit, said industrial robot comprising:

current detecting means for detecting an electric current supplied to each of said electric motors associated with the articulatory axis during motion of an associated functional robot unit about the same articulatory axis;

first storage means for storing digital values representing the electric currents detected by said current detecting means;

second storage means for integrating predetermined minute sampling times in a period between a first time and a second time during motion of each functional robot unit, and for storing a sum of said predetermined minute sampling times;

computing means for calculating a ratio of a root-mean-square value of said electric current supplied to each said electric motor to the rated current of said same electric motor on the basis of said sample currents read from said first storage means at each predetermined minute sampling time and said sum of said predetermined minute sampling times calculated by and stored in said second storage means; and display means for displaying said root-mean-square values of said electric current supplied to said electric motors and the ratios each of the root-mean-square value of said electric current supplied to each said electric motor to the rated current of said same electric motor calculated by said computing means;

to thereby ascertain the propriety of motions of said functional robot units about the associated articulatory axes with reference to said rated currents of said electric motors.

4. An industrial robot according to claim 3, wherein said robot control unit includes said first and second means, said computing means and said display means, and wherein said current detecting means for detecting the electric currents supplied to said electric motors comprises an analogue detector for detecting the electric drive currents supplied to said electric motors in analogue values, and an AD converter for converting the analogue values to corresponding digital values and for inputting said digital values to said first storage means.

5. An industrial robot according to claim 4, wherein said current detecting means for detecting the electric currents supplied to said electric motors is an external means connected to the robot control unit.

6. An industrial robot according to claim 5, wherein said first and second storage means comprise RAMs.

7. An industrial robot according to claim 3, wherein said functional robot units associated respectively with the articulatory axes are a vertically movable shaft and at least two articulated horizontal robot arms turnably supported on the vertically movable shaft.

* * * * *